United States Patent
Henry et al.

(10) Patent No.: US 10,623,994 B2
(45) Date of Patent: Apr. 14, 2020

(54) FLASH CROWD DETECTION AND RESPONSIVE NETWORK MANAGEMENT

(71) Applicant: Cisco Technology, Inc., San Jose, CA (US)

(72) Inventors: Jerome Henry, Pittsboro, NC (US); Rajesh S. Pazhyannur, Fremont, CA (US); Waseem A. Siddiqi, Campbell, CA (US); Ramanujam Jagannath, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 78 days.

(21) Appl. No.: 15/902,239

(22) Filed: Feb. 22, 2018

(65) Prior Publication Data
US 2019/0261221 A1    Aug. 22, 2019

(51) Int. Cl.
*H04W 28/08* (2009.01)
*H04W 28/02* (2009.01)
*H04L 12/24* (2006.01)
*G06N 20/00* (2019.01)

(52) U.S. Cl.
CPC .......... *H04W 28/08* (2013.01); *G06N 20/00* (2019.01); *H04L 41/147* (2013.01); *H04W 28/0226* (2013.01)

(58) Field of Classification Search
CPC .............. H04W 28/08; H04W 28/0226; H04L 41/147; G06N 20/00
See application file for complete search history.

(56) References Cited

U.S. PATENT DOCUMENTS

| | | | |
|---|---|---|---|
| RE44,606 E * | 11/2013 | Herz .................. | H04W 4/029 455/445 |
| 9,084,179 B2 | 7/2015 | Visuri et al. | |
| 9,301,100 B1 * | 3/2016 | Jampani ............... | G01S 5/0278 |
| 9,408,037 B1 * | 8/2016 | Alizadeh-Shabdiz ...................... | H04W 4/029 |

(Continued)

FOREIGN PATENT DOCUMENTS

KR    20160077932 A    7/2016

OTHER PUBLICATIONS

Kuruvatti et al., "Prediction of Dynamic Crowd Formation in Cellular Networks for Activating Small Cells", IEEE, 2015.*

(Continued)

*Primary Examiner* — Saad A. Waqas
(74) *Attorney, Agent, or Firm* — Behmke Innovation Group LLC; James Behmke; Stephen D. LeBarron (57) ABSTRACT

In one embodiment, a computing device determines a plurality of probability-based trajectories a mobile device could traverse through a plurality of access point (AP) cells within a given area depending on an entry point of the mobile device into the given area. A predictive dwell time may also be associated to each AP cell based on how long a mobile device is expected to remain within the respective AP cell. Based on i) current locations of mobile devices, ii) the plurality of probability-based trajectories a mobile device could traverse through the plurality of AP cells, and iii) the predictive dwell time of each AP cell, the computing device can compute a probability of mobile device density surpassing a potential flash crowd threshold within each AP cell at any given future time. In response, the computing device may then perform one or more mitigation actions.

19 Claims, 9 Drawing Sheets

(56) References Cited

U.S. PATENT DOCUMENTS

| | | | |
|---|---|---|---|
| 9,451,451 B2 | 9/2016 | Chow et al. | |
| 9,578,596 B1* | 2/2017 | Rodoper | H04W 48/16 |
| 2013/0281049 A1* | 10/2013 | Lee | H04W 24/00 |
| | | | 455/405 |
| 2014/0171126 A1* | 6/2014 | Mayor | G01S 5/14 |
| | | | 455/456.6 |
| 2015/0264582 A1* | 9/2015 | Brighenti | H04W 16/08 |
| | | | 455/446 |
| 2015/0319658 A1* | 11/2015 | Padden | H04W 16/14 |
| | | | 455/436 |
| 2016/0349351 A1 | 12/2016 | Ludden | |
| 2017/0078956 A1* | 3/2017 | LeBlanc | H04W 48/18 |
| 2018/0109399 A1* | 4/2018 | Cardoso de Moura | |
| | | | H04L 12/4633 |
| 2018/0211534 A1* | 7/2018 | de Moura | G06Q 50/30 |
| 2018/0332480 A1* | 11/2018 | Pang | H04W 16/18 |
| 2019/0036630 A1* | 1/2019 | Svennebring | H04B 17/373 |
| 2019/0141668 A1* | 5/2019 | Meredith | H04W 64/006 |

OTHER PUBLICATIONS

Kim, et al., "A Detection Mechanism for SMS Flooding Attacks in Cellular Networks", Security and Privacy in Communication Networks. SecureComm 2012. Lecture Notes of the Institute for Computer Sciences, Social Informatics and Telecommunications Engineering, vol. 106, Springer, Berlin, Heidelberg.

Moura, et al., "Efficient access of mobile flows to heterogeneous networks under flash crowds", Computer Networks, 17 pages, 2016, Elsevier B.V.

Paula, et al., "Detecting and Handling Flash-Crowd Events on Cloud Environments", ACM Transactions on the Web (TWEB), arXiv:1510.03913v1, 2015, 22 pages, ACM.

Rani, et al., "Discerning flooding attack from flash crowd based on traffic patterns using entropy detection method", 2015 International Conference on Circuits, Power and Computing Technologies, 2015, pp. 1-6, IEEE.

Zhanikeev, et al., "A graphical method for detection of Flash Crowds in traffic", Telecommunications Systems, vol. 57 Issue 1, Sep. 2014, pp. 91-105, Kluwer Academic Publishers.

* cited by examiner

| DEVICES 410 \ APs 420 | AP1 | AP2 | AP3 | AP4 | ... | APN |
|---|---|---|---|---|---|---|
| D1 | 1 | 2 | | 2 | | 3 |
| D2 | | 2 | 1 | | | |
| D3 | 1 | | | 2 | | 3 |
| D4 | 1 | | | 2 | | |
| ... | | | | | | |
| DN | | | 1 | 2 | | |

| AP CELL 610 | DWELL TIME 620 |
|---|---|
| AP1 | 1-2 MINS |
| AP2 | 30-45 SECS |
| AP3 | 2-3 HRS |
| AP4 | 5-15 MINS |
| ... | ... |
| APN | 20-30 MINS |

FLASH CROWD DETECTION AND RESPONSIVE NETWORK MANAGEMENT

TECHNICAL FIELD

The present disclosure relates generally to computer networks, and, more particularly, to flash crowd detection and responsive network management.

BACKGROUND

Public venues experience a phenomenon commonly called "flash crowds". In this scenario, people converge to a particular location and form a dense temporary group. The group may stay relatively static, staying in the same location before dispersing, or else it can move around. Typical cases include group visits of a facility, lines to access a service, large offloading of people (e.g., buses or other mass transit systems), etc. In locations where flash crowds form, Wi-Fi often becomes barely usable, as too many users are connecting to the same access point, and sharing the same limited resources. Flash crowd users and non-flash crowd users are likely to complain about Wi-Fi quality.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a computing device determines a plurality of probability-based trajectories a mobile device could traverse through a plurality of access point (AP) cells within a given area depending on an entry point of the mobile device into the given area from a plurality of possible entry points. A predictive dwell time may also be associated to each AP cell based on how long a mobile device is expected to remain within the respective AP cell. Once the computing device determines current locations of mobile devices within the given area, it can then compute, based on i) the current locations of mobile devices, ii) the plurality of probability-based trajectories a mobile device could traverse through the plurality of AP cells, and iii) the predictive dwell time of each AP cell, a probability of mobile device density surpassing a potential flash crowd threshold within each AP cell at any given future time. In response to the probability of mobile device density surpassing the potential flash crowd threshold for a particular AP cell, the computing device may then perform one or more mitigation actions.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
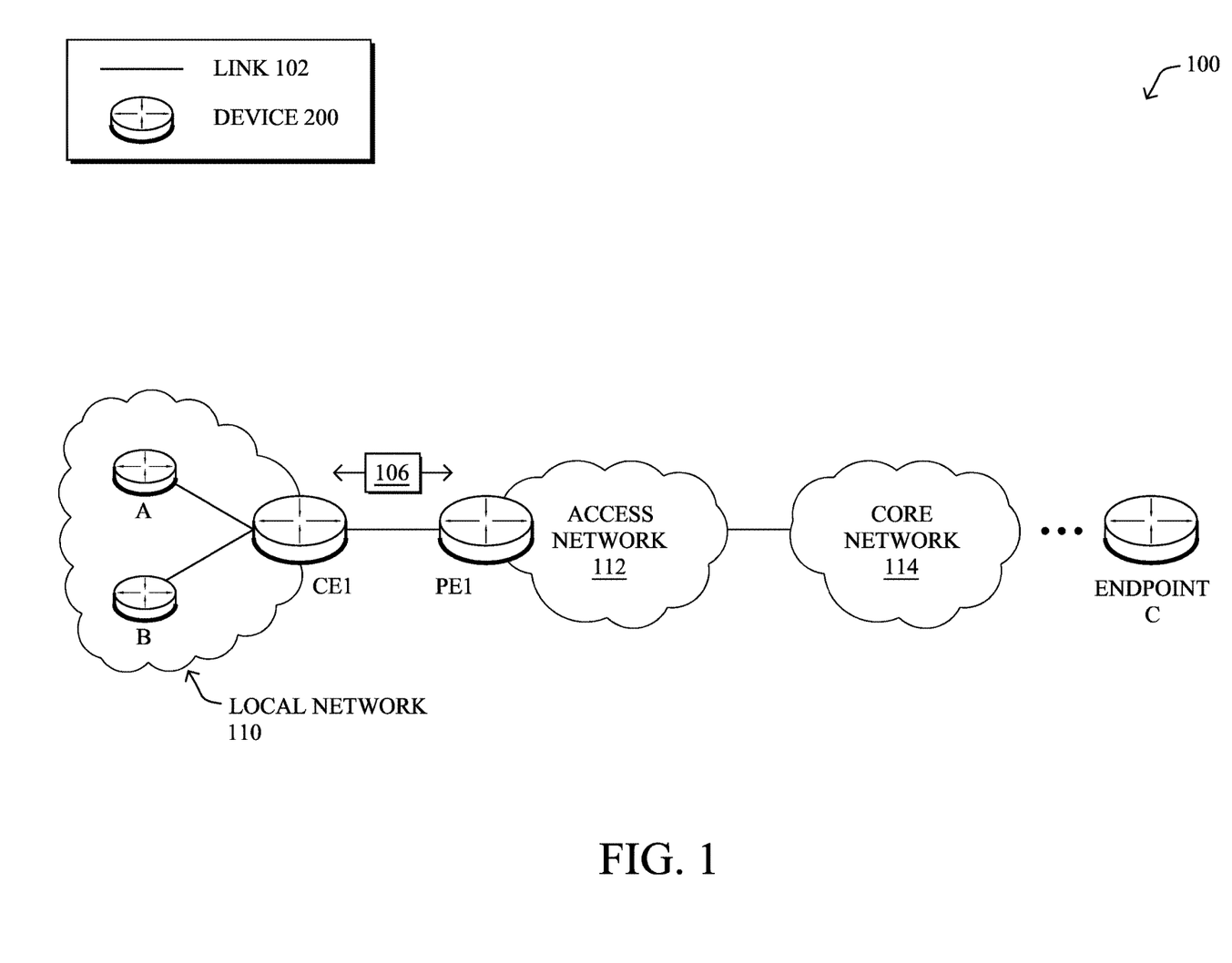
FIG. 1 illustrates an example communication network.

FIG. 1 is a schematic block diagram of an example communication network 100 illustratively comprising nodes/devices 200, such as a plurality of routers/devices interconnected by links and/or networks, as shown. For example, a customer edge (CE) router CE1 may interconnect nodes A and B on a local network 110 with a provider edge (PE) router PE1 of an access network 112. In turn, access network 112 may provide local network 110 with connectivity to a core network 114, such as the Internet.

The various nodes/devices 200 may exchange data packets 106 (e.g., traffic/messages) via communication network 100 over links 102 using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity. For example, node A in local network 110 may communicate with an endpoint node/device C (e.g., a remote server, etc.) via communication network 100.

As would be appreciated, links 102 may include any number of wired and/or wireless connections between devices. For example, node A may communicate wirelessly using a WiFi™ connection, CE1 and PE1 may communicate wirelessly using a cellular connection or via a hardwired connection (e.g., DSL, etc.), etc. In addition, while certain devices are depicted in FIG. 1, the view shown is a simplified view of communication network 100. In other words, communication network 100 may also include any number of intermediary networking devices such as, but not limited to, routers, switches, firewalls, etc., that are not shown.

In various embodiments, nodes/devices 200 may employ a secure communication mechanism, to encrypt and decrypt data packets 106. For example, nodes/devices 200 shown may use a Transport Layer Security (TLS) mechanism, such as the hypertext transfer protocol (HTTP) secure (HTTPS) protocol, to encrypt and decrypt data packets 106.

Figure 2:
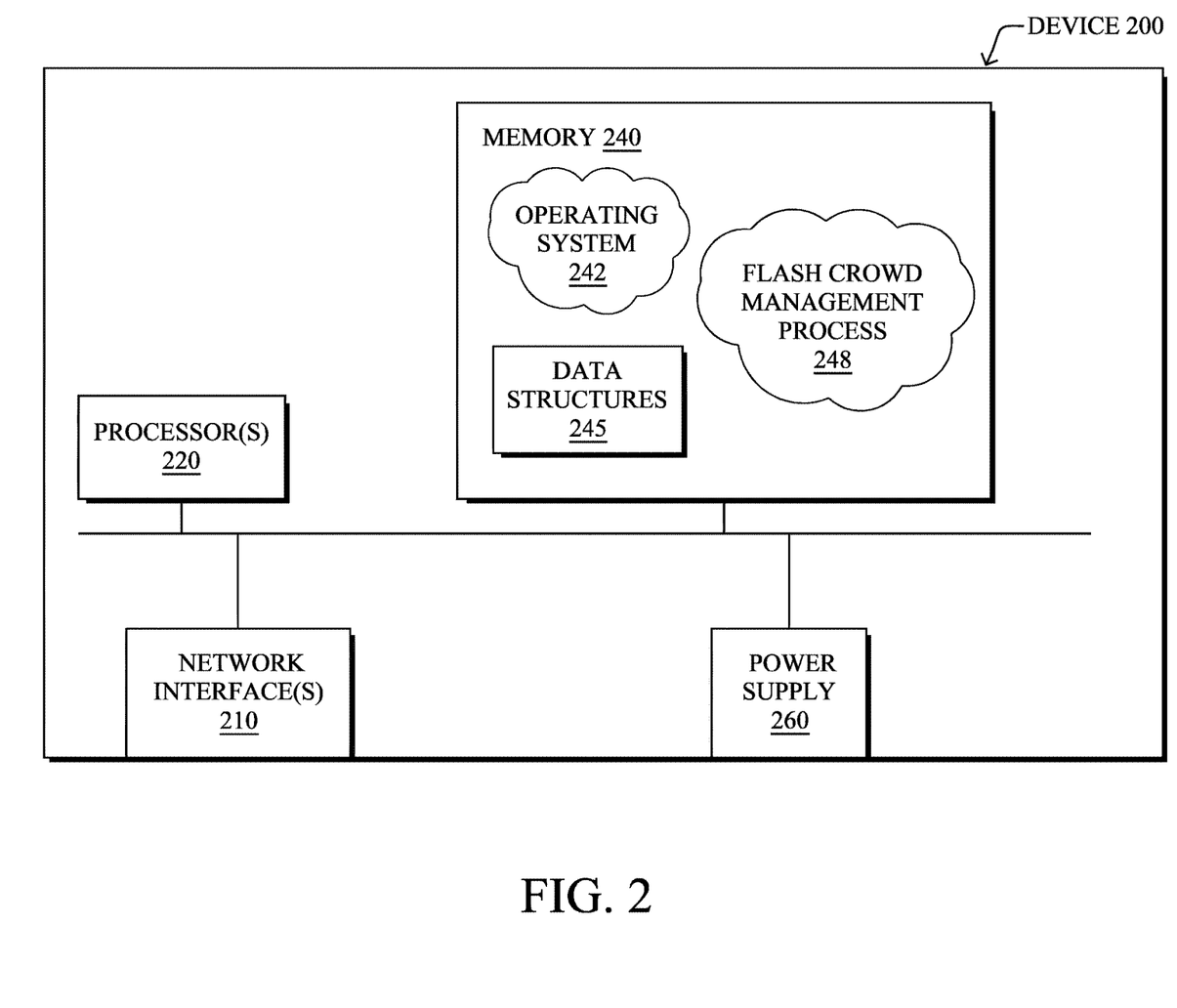
FIG. 2 illustrates an example network device/node.

FIG. 2 is a schematic block diagram of an example node/device 200 that may be used with one or more embodiments described herein, e.g., as any of the computing devices shown in FIG. 1, any other computing device that supports the operations of network 100 (e.g., switches, etc.), or any of the other devices referenced below. The device 200 may also be any other suitable type of device depending upon the type of network architecture in place. As shown, device 200 comprises one or more network interface(s) 210, one or more processor(s) 220, and a memory 240 interconnected by a system bus 250 and powered by a power supply 260.

The network interface(s) 210 include the mechanical, electrical, and signaling circuitry for communicating data over physical and/or wireless links coupled to the network 100. The network interfaces may be configured to transmit and/or receive data using a variety of different communication protocols. Notably, a network interface 210 may also be used to implement one or more virtual network interfaces, such as for virtual private network (VPN) access, known to those skilled in the art.

The memory 240 comprises a plurality of storage locations that are addressable by the processor(s) 220 and the network interface(s) 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the node by, among other things, invoking network operations in support of software processors and/or services executing on the device. These software processors and/or services may comprise a flash crowd management process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various embodiments, machine learning techniques may be utilized to perform some of the embodiments described herein. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

—Flash Crowd Detection and Management—

As noted above, public venues experience a phenomenon commonly called "flash crowds", where people converge to form a dense temporary group. Many studies exist around flash crowds to evaluate their effect on shared resources. As the term refers to a sudden aggregation of people, the phenomenon has been studied with several angles, often around people count and crowd estimation. The term has been widely used to describe other types of sudden aggregation, such as sudden large quantity of users visiting the same web site in a short interval. However, in computer networking, flash crowds often result in network congestion, such as where Wi-Fi becomes difficult to use (failed logins, slow service, etc.), since too many users are connecting to the same access point, and sharing the same limited resources. That is, wireless networking (e.g., IEEE Standard 802.11) is often affected when a sudden large aggregation of humans occurs, and as a consequence, a sudden large aggregation of Wi-Fi devices also occurs, often hindering network performance or even rendering a Wi-Fi network unusable.

Notably, 802.11ai provides a means to expedite association between a device and an access point (AP), and is useful for sudden burst of users into a cell (e.g., the "Tokyo station issue" as will be understood by those skilled in the art). However, 802.11ai does not provide a mechanism to anticipate the appearance of many users in a cell, and also does not provide remediation beyond fast initial link setup (FILS).

The techniques herein, on the other hand, anticipate the formation of flash crowds (predicting the increased user/device density at any point of the network), and provide remediation to mitigate the impact of a saturated cell on the user experience. The techniques herein thus assist in providing visibility into the state of the network and its performance, predicting the upcoming state of the network, and providing remediation whenever possible. In particular, the techniques herein use knowledge of user counts, user increases, trajectory probabilities, and dwell time probabilities to predict potential times and zones of flash crowds that may saturate the local wireless (e.g., Wi-Fi) resources. With this knowledge, the techniques herein may dynamically modify the power and channel parameters of the APs on the paths of users and at the anticipated congestion point, in order to spread the device load over a larger cell count, thus limiting the strain on each channel and AP resources.

Specifically, according to one or more embodiments of the disclosure as described in detail below, a computing device determines a plurality of probability-based trajectories a mobile device could traverse through a plurality of access point (AP) cells within a given area depending on an entry point of the mobile device into the given area from a plurality of possible entry points. A predictive dwell time may also be associated to each AP cell based on how long a mobile device is expected to remain within the respective AP cell. Once the computing device determines current locations of mobile devices within the given area, it can then compute, based on i) the current locations of mobile devices, ii) the plurality of probability-based trajectories a mobile device could traverse through the plurality of AP cells, and iii) the predictive dwell time of each AP cell, a probability of mobile device density surpassing a potential flash crowd threshold within each AP cell at any given future time. In response to the probability of mobile device density surpassing the potential flash crowd threshold for a particular AP cell, the computing device may then perform one or more mitigation actions.

Illustratively, the techniques described herein may be performed by hardware, software, and/or firmware, such as in accordance with the flash crowd management process 248, which may include computer executable instructions executed by the processor 220 to perform functions relating to the techniques described herein, e.g., in conjunction with other processes and/or other devices (e.g., a centralized computing device interacting with a plurality of access points, etc.).

Figure 3:
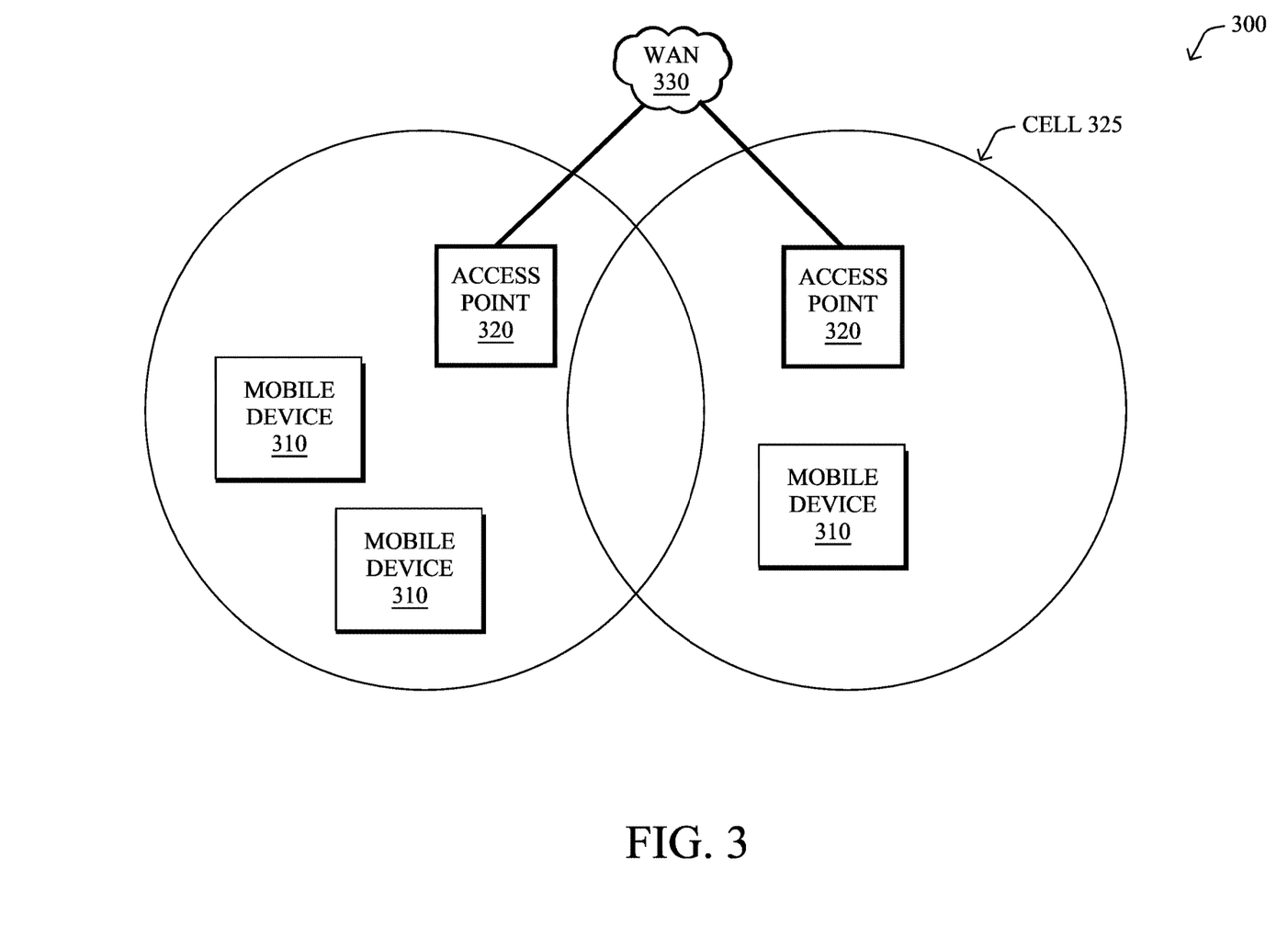
FIG. 3 illustrates an example wireless network.

FIG. 3 illustrates a simplified example of a wireless network 300, where wireless devices, particularly mobile devices 310, communicate directly with access points (APs) 320 in order to reach each other or more generally a WAN 330 or other network (e.g., directly or else through local routers/switches/etc. prior). Notably, each AP 320 establishes a wireless signal for a given range (distance from the AP) that establishes a "cell" 325, though as used herein, the terms "AP", "cell", and "AP cell" may be used interchangeably where applicable.

Operationally, the techniques herein are associated three complementary components: a flash crowd prediction system, an individual device behavior prediction system, and a flash crowd mitigation system.

The first component herein, the flash crowd prediction system (e.g., based on roaming vectors), is itself composed of two components: a roaming prediction algorithm and a dwell time prediction algorithm. Though prior techniques that will be understood by those skilled in the art are often meant to address which next AP an individual client on a given AP is likely to roam to (i.e., the "best next AP"), the techniques herein extend this concept such that for each user entering a cell, the probable series of next cells is computed as a probability tree (e.g., based on overall statistical models of prediction).

Figure 4:
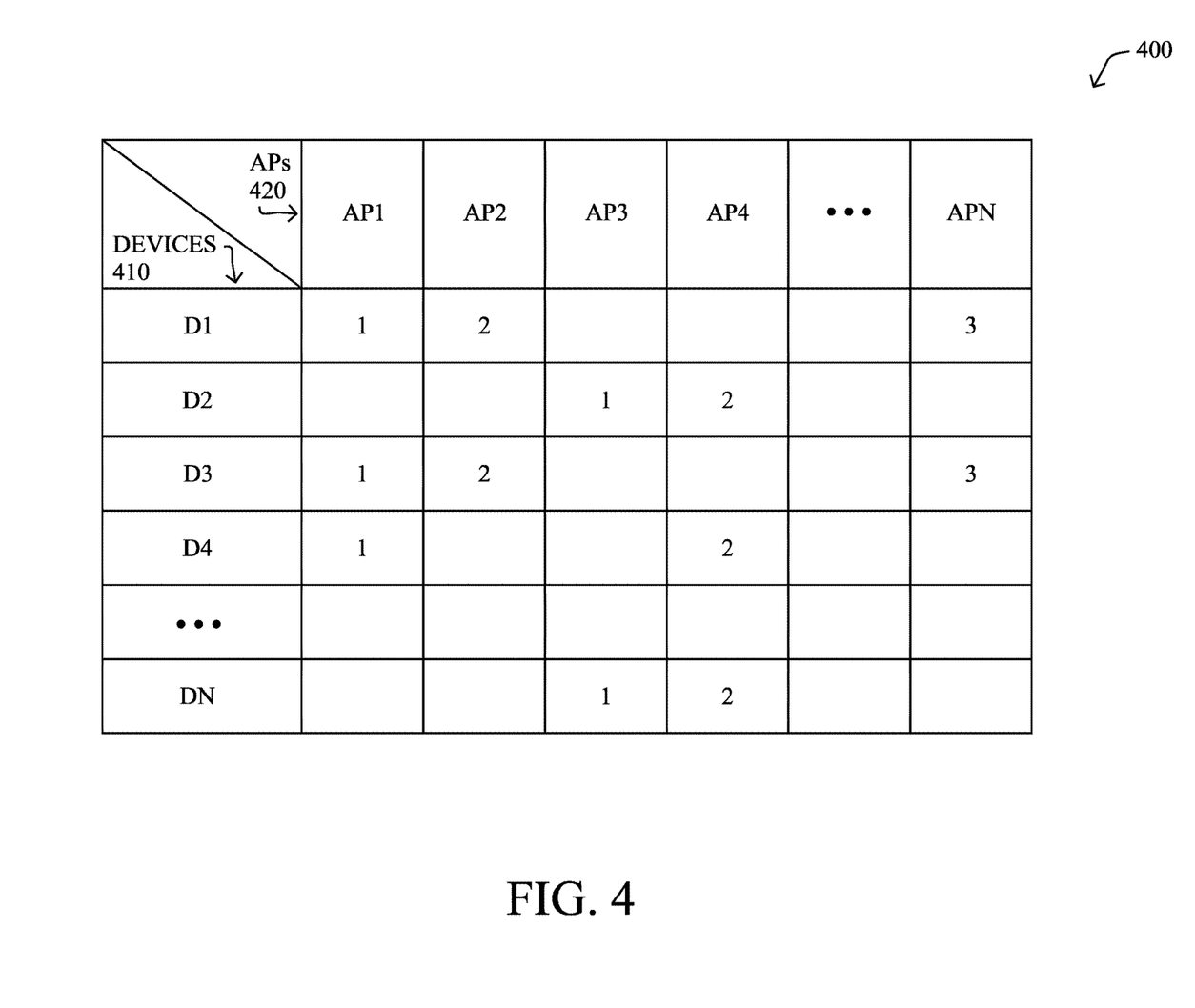
FIG. 4 illustrates an example of mobile device movement history.

In particular, as users (mobile devices 310) are observed roaming between APs 320, these roams may be recorded by the infrastructure over time, and fed into a roaming matrix 400 as shown in FIG. 4. For instance, though only one example format, the rows represent mobile devices 410 (e.g., devices D1-DN), and columns represent the AP 420 to which that mobile device roamed (e.g., out of APs AP1-APN). Any format may be used, such as listing the APs, ordering the APs, etc., and the format shown is merely one simplified example.

From this collected data, various algorithms (e.g., linear regression or other regression techniques) may be used to predict, for a new mobile device appearing in some entry point cell APn, the probable trajectories for that mobile device throughout the APs in the area combining the probability trees for all APs in the area (e.g., on a given floor, or in more complex scenarios, across multiple floors of an area, such as a shopping mall).

As mentioned above, though previous techniques focus on determining if a mobile device in AP1 is likely to roam to AP2 or to AP3, the techniques herein specifically aim to compute the probability that a mobile device in AP1 is likely to take a particular trajectory (a path through a set of AP cells), such as, for example an AP1-AP3-AP5-AP8 trajectory, or an AP1-AP4-AP6-AP7-AP9 trajectory.

Figure 5:
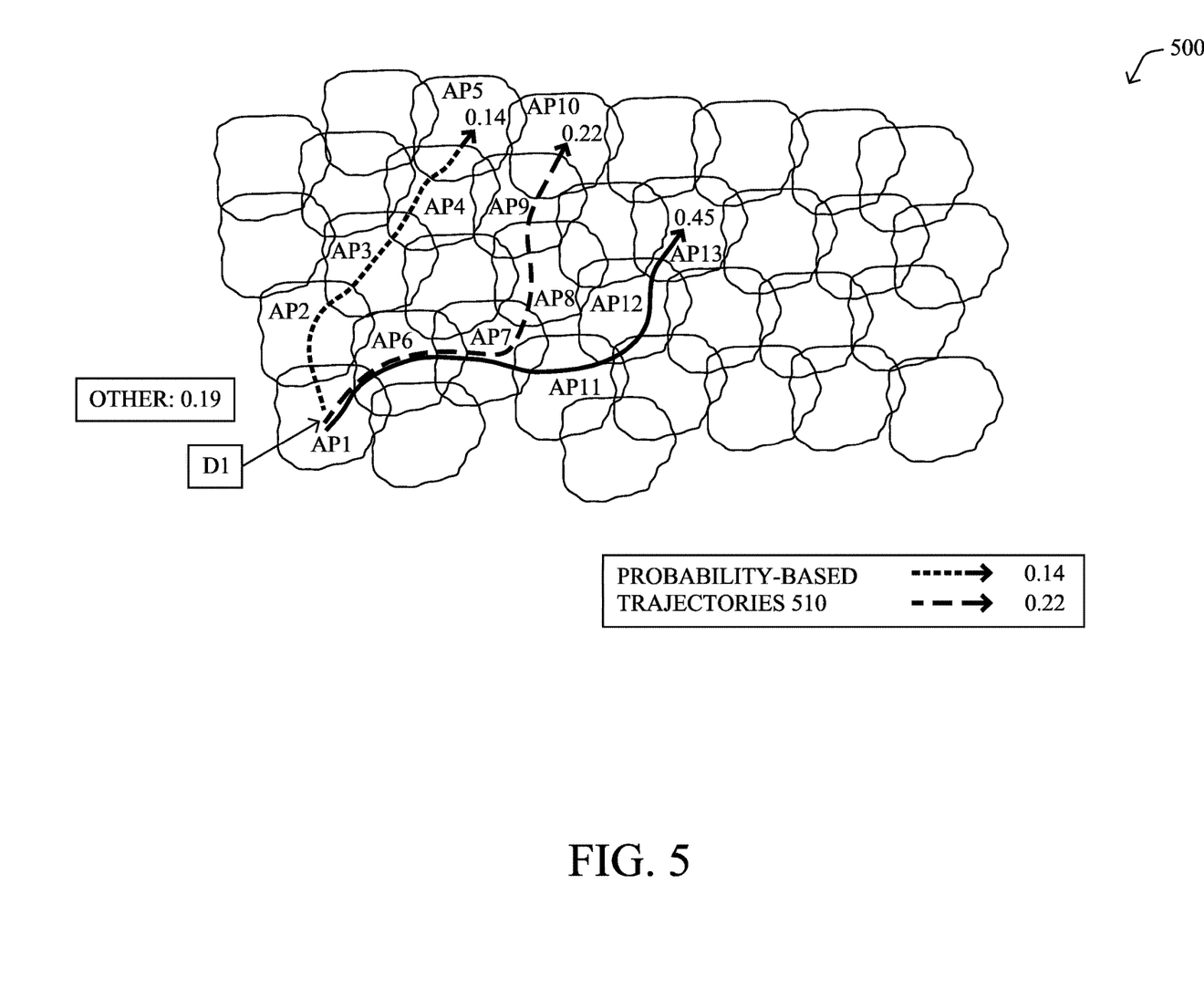
FIG. 5 illustrates an example of probability-based trajectories.

FIG. 5 illustrates the concept of a mobile device D1 entering a given area 500, and the probability-based trajectories 510 (e.g., individual lines or a tree) leading to ultimate AP cells (e.g., at a given time tin the future). For instance, from entry point AP1, path option 1 traverses AP1-AP2-AP3-AP4-AP5, with a probability of 0.14 (e.g., a 14% chance). Option 2 traverses AP1-AP6-AP7-AP8-AP9-AP10, with a probability of 0.22, and option 3 traverses AP1-AP6-AP7-AP11-AP12-AP13, with a probability of 0.45. Notably, other paths may be maintained, or simply stored as a collective "other" category (e.g., 0.19 probability), such as a number of paths that individually have a probability less than a certain amount (e.g., less than 5% chance).

The predictions herein can be refreshed as the mobile device roams in order to improve the prediction at short term. That is, as the mobile device moves within the area, e.g., along the path according to option 2, the probability that the device is traversing down that particular trajectory may increase.

As mentioned above, linear regression can be used to predict the most likely trajectory for a new mobile device, but at a larger scale (e.g., the scale of an entire facility), larger probability trees can be built, such as using standard Laplacian probability rules to more refined methods, for example introducing weights based on client type (e.g., type of device, type of user associated with the device, etc.).

Note further that the probability-based trajectories can be used to anticipate AP cells of potential crowding, that is, locations where many mobile devices are likely to converge, regardless of their entry point (and optionally irrespective of time). For example, conference rooms may be empty most of the day, but can be known locations for convergence of many devices within an office space. As such, different mitigation techniques (described below) may be used for such cells, either ahead of time (e.g., network planning, such as adding a new AP in the conference room and optionally only activating it as needed), or in response to a flash crowd already existing (e.g., when congestion happens, such as when specific thresholds are reached or STAs are detected converging toward the congestion point).

Figure 6:
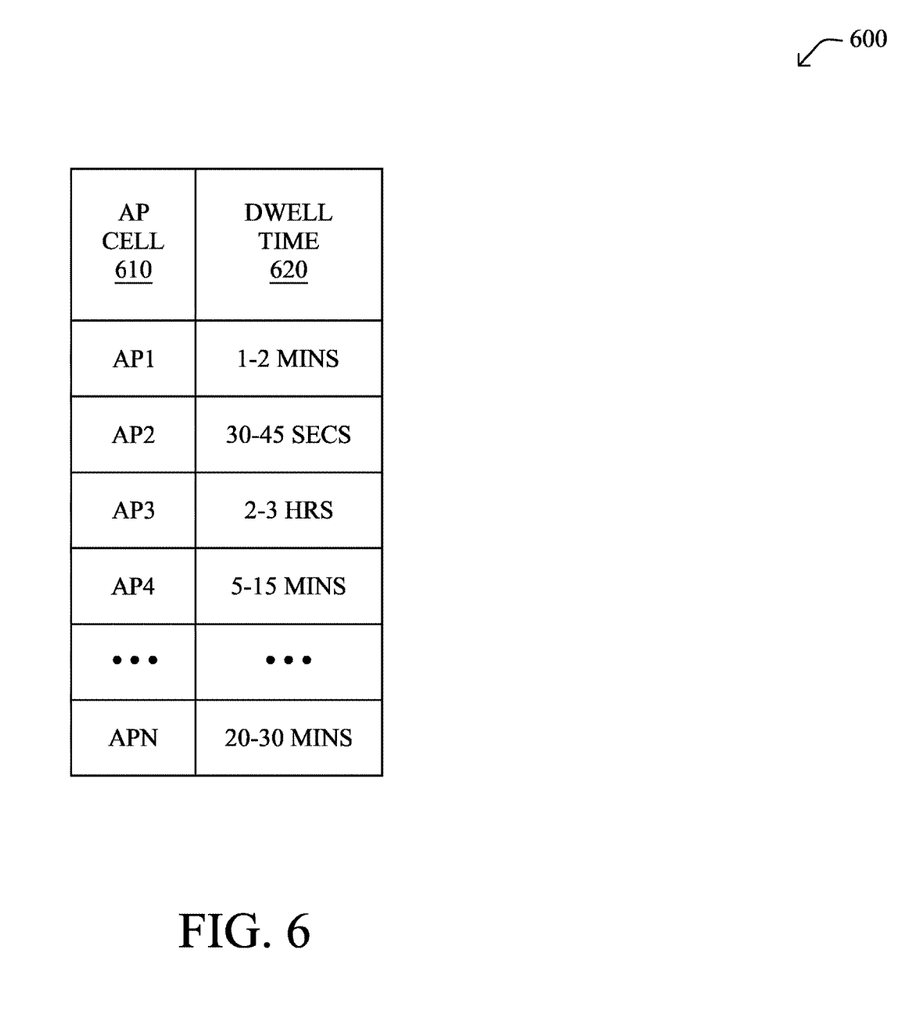
FIG. 6 illustrates an example dwell time chart.

According to the one or more embodiments herein, specifically regarding the dwelling prediction mentioned above, when each mobile device enters a cell, the techniques herein can measure the average dwell time of this mobile device in the cell before roaming to the next cell. This algorithm can be used to differentiate transit locations (e.g., hallways) from dwelling locations (e.g., waiting or resting areas, such as hotel lobbies, conference rooms, food courts, etc.), and from hybrid locations (e.g., indoor streets with cafe/terraces in a mall, coffee shops for either five minutes or two hours, etc.). For example, FIG. 6 illustrates an example simplified listing 600 of AP cell dwell times. Note that as shown, each AP cell 610 is associated with a single dwell time 620, but each may be associated with a dwell type (e.g., transit, dwelling, hybrid, etc.) instead. Further, the listing may actually be much more complex, such as basing the dwell times on entry points, neighboring AP cells (e.g., if coming from AP1, mobile devices dwell in AP2 for three minutes, but if coming from AP3, mobile devices dwell in AP2 for thirty seconds).

The processing of the resultant matrix may be similar to those mentioned above, and then both matrices can be combined in a higher order linear regression process to establish timed probabilistic projections of users trajectories across an area. In other words, for a mobile device entering the area through a particular AP, the techniques herein determine the likely position of this mobile device in the area at a certain time in the future (or after a certain amount of time).

Figure 7:
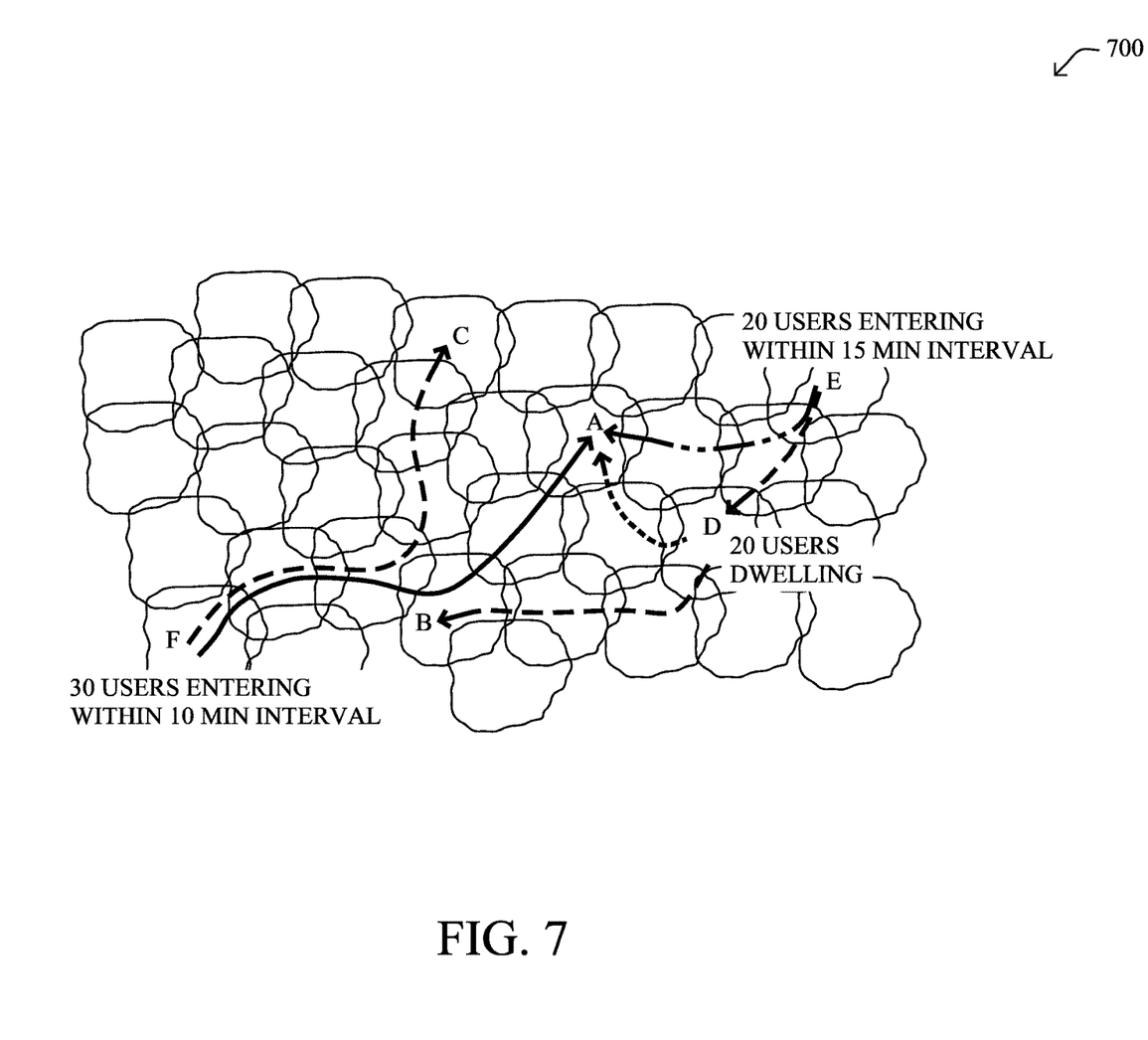
FIG. 7 illustrates an example of potential flash crowding.

For example, in the illustration 700 of FIG. 7, the combined algorithms measure mobile devices walking through transit AP cells over a period of time (e.g., cells E and F), mobile devices staying in dwelling cells (e.g., cell D) for measured periods of times. In this example, assume that measurements showed that the probability for a mobile device (user) entering through door F in the 11 AM to 12 PM time window to reach cell A (e.g., a food court) within 20 minutes is 0.685. The average dwell time for such a mobile device in cell A is 48 minutes. Based on the number of mobile devices entering through door F during that time window, the algorithm can determine the projected density of mobile devices in cell A for the next time window. Similar projections are made for the other entry points and trajectories throughout the area. In other words, based on the current mobile device count and location, and past recorded trajectories and average dwell times, the model measures the probability of density rapidly increasing in a particular location (e.g., point A), but also the probability of mobile devices moving to scarce locations (e.g., points C or B). As more mobile devices enter through F and E over a short period of time, the probability of a flash crowd event in A in the upcoming time window increases, and a pre-warning can be raised. Proactive actions can be taken as well, as described below.

Notably, the above mechanism relies on a reasonably large training set for any given facility. In closed environments (e.g., airports, shopping malls, etc.), there may be seasonality in the user density, but the user behavior is likely to be constant. Users walk in through doors, sit at bars, walk slower in stores than in open areas, etc. The model can thus be trained and applied successfully. Prediction is more difficult for temporal events (e.g., fairs, conferences, trade shows, etc.), or in locations where training set is not existent. A shorter model can be applied to these locations.

For instance, assume the techniques herein are configured to predict flash crowd in AP A at time n+k, k>0 based on data available until time n. The techniques herein may thus use two concepts about flash crowds:

The client count in certain neighboring APs is an early indicator of flash crowding in AP A. For example, APs in a lobby or APs in the vicinity of flash crowd area are predictors of increased clients in A at some time in the future.

The ratio of clients added in a successive time interval in AP A is also an indicator. Typically, flash crowds are characterized by not just by large number of clients but also a rapid increase in the number of clients (meaning at the rate at which clients are added is very high).

Accordingly, the techniques herein can use these concepts to create a feature set that contains, for example:

1. For every 30-second window, the techniques compute the average number of clients on neighboring APs of A, e.g., $C\_\{n,j\}$, denoting the number of clients in time interval n, and j is the AP in the neighborhood of A "Nbr_(A)".
2. For every 30-second window, the techniques compute the ratio of clients in AP A over successive intervals, e.g., $C\_\{n+1,A\}/C\_\{n,A\}$.

Based on observations at time n, therefore, the techniques herein can predict $C\_\{n+k, A\}$, the value of client count at k intervals in the future. Given time intervals of 30-seconds, for example, k could be set to be about 10 or higher. If the prediction is significantly higher than a threshold (in terms of number of clients/devices, or rate of increase in clients) then the techniques herein can declare that there will likely be flash crowd k units in the future. (Notably, this model is a regression problem with features described above as inputs and outputs as the number of clients in AP A.)

As described further below, the techniques herein can use the predictions above to anticipate the density increase and perform one or more mitigation actions, such as changing the target AP's parameters to spread the incoming mobile devices across more AP cells, thus reducing the stress on individual APs and channels.

Note that individual device behavior may be taken into consideration in the probabilistic algorithms above (and the mitigation techniques below). For instance, mobile devices, and particularly Wi-Fi devices, come in multiple forms and shapes, with various roaming behaviors. Typical classes of behaviors can be observed. For example, while devices from a first manufacturer (a particular operating system) may be set to start probing for next APs when the AP signal falls under −70 dBm (from the client perspective), devices from a second manufacturer may only display this behavior when the AP signal falls below −5 dBm. Similarly, various classes of behaviors can be observed for tablets vs phones of the same manufacturer, vs the same devices with a different version of an operating system, etc. Even within a single class, individual behaviors can be observed. For instance, one individual smartphone with a rigid cover may result in probing detected when the device signal at the AP is −67 dBm while another, coverless smartphone of the same characteristics otherwise, may display the same probing behavior at −72 dBm average signal at the AP.

According to one or more embodiments of the present disclosure, therefore, with solutions like AP radio Inline Monitoring (ILM), the techniques herein may record the threshold (RSSI/SNR at the current AP) at which each individual client starts probing at the edge of the cell (this behavior is well known and detectable, because the client probes "actively", e.g., every few seconds, while the keepalive probes occur at longer intervals, e.g., minutes). The techniques herein may also record the signal level at which each client roams away to another AP. This recording allows the techniques herein to establish a roaming profile for each individual client, which, in turn, allows the system to determine if a client is likely to be stable (not attempting to probe, and/or not attempting to roam) at a given signal level. This dataset can then be then coupled with the AP power (AP power can be configured to change over stepped values) to estimate the likely probing location and cell edge, seen from each client device for each cell. (Here again, a supervised model (e.g., linear regression) may be used.)

According to the present disclosure, the techniques herein also specifically provide for one or more flash crowd mitigation actions. For instance, as mentioned above, the flash crowd prediction algorithms described herein predict the probability of the density of mobile devices (users) increasing rapidly at a given location (where, notably, "location" can span one or multiple cells). This prediction can be made at a short time scale (e.g., a few minutes/tens of minutes) to maintain high probability based on observed mobile device locations and trajectories. Also, in certain embodiments, the individual device behavior prediction system noted above can record the expected roaming behavior of contributing devices in parallel. Flash crowd mitigation techniques herein may thus be implemented based on the probability-based trajectories, timing, etc.

Figure 8:
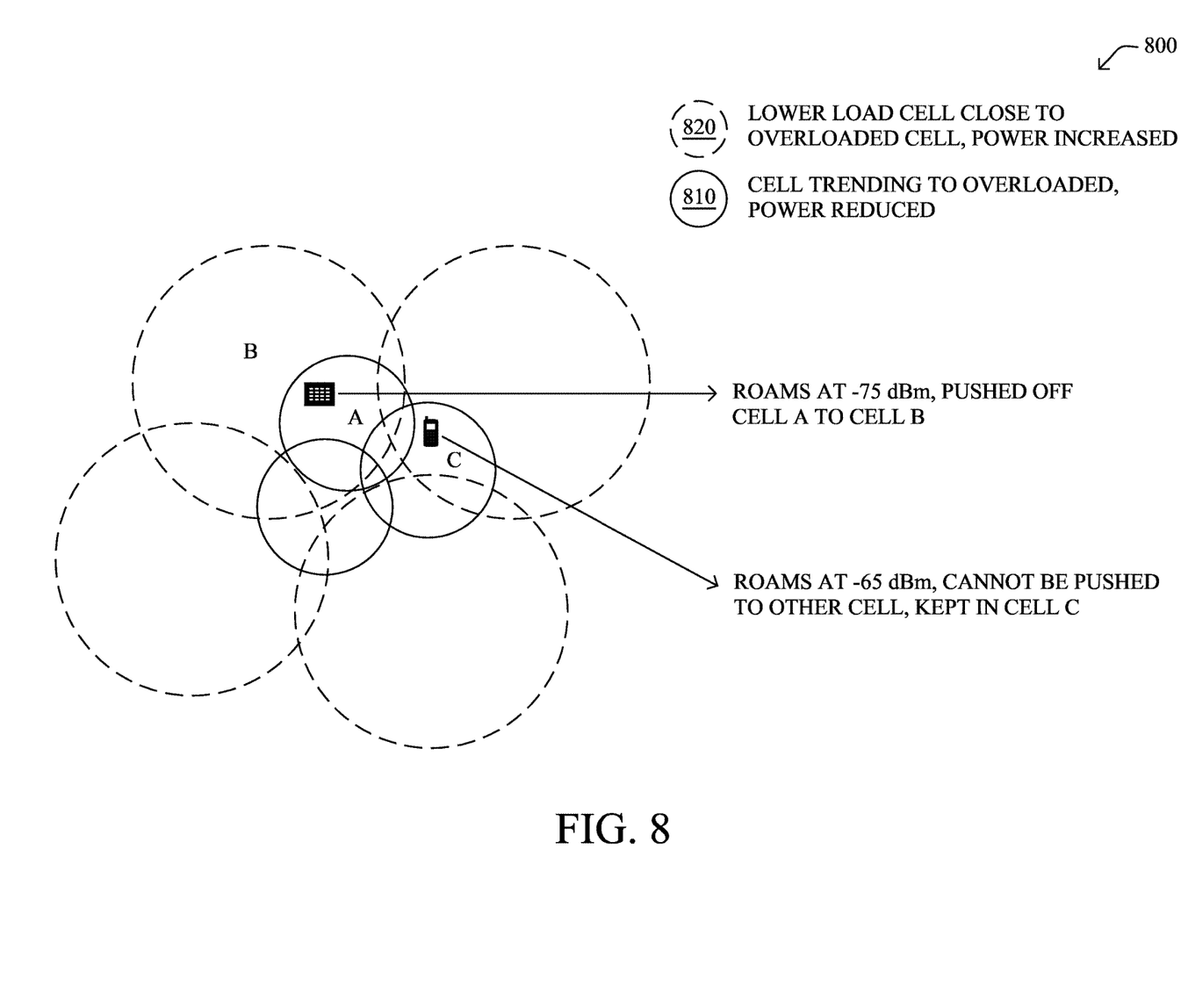
FIG. 8 illustrates an example of access point power adjustment.

Specifically, for each cell for which flash crowd probability is detected, as mobile device density increases, the flash crowd mitigation system herein may be activated to limit the impact of the density increase on wireless network (e.g., Wi-Fi) service. This mitigation system may illustratively leverage any one of or any combination of the mechanisms mentioned below, among others (which, notably, may have respective weights configured to each action when performed in combination):

a.) "Power play": As demonstrated in the wireless AP environment 800 of FIG. 8, as a given cell user load increases, the AP power of that cell may be reduced (e.g., cells 810, such as cells A and C), while the neighboring AP power may be increased (e.g., cells 820, such as cell B). This mechanism aims at spreading the load among neighboring cells by reducing the size of cells with higher loads and increasing the size of neighboring cells with lower load.

b.) "Directed roaming": As users converge toward the same point, active roaming mechanisms may be enabled, such as, e.g., 802.11v directed roams, optimized roaming (forceful disconnects), and others. Device profiles in particular (as mentioned above) may be leveraged to load balance devices whenever possible. For examples, devices that are recorded with a lower roaming RSSI threshold (e.g., −75 dBm) can be pushed to neighboring cells while at the edge or within good range of the affected AP, while devices with lower signal range tolerance (that would roam at −65 dBm for example) may be left in the affected cell (because they would try to roam back anyway). (This is also illustrated in FIG. 8).

d.) 2.4 GHz/5 GHz arbitration: Selected dual band devices can be pushed to the 2.4 GHz band when available (dual band overloaded APs) to balance the load between radios.

e.) Client and traffic considerations: The above load balancing methods can be refined by taking into account the traffic type. For example, Wi-Fi defines access categories (AC) such as voice (AC_VO), video (AC_VI), best effort (AC_BE), and background (AC_BK). As such, devices using lower ACs while converging to the flash crowd points (e.g., BE traffic) can be load balanced (pushed to neighboring cells) more aggressively than devices using higher ACs (e.g., AC_VO). This flexibility can translate in different thresholds for these different devices (e.g., devices with AC_BE traffic will start being load balanced at 40% CU while AC_VO devices will not be load balanced out of the cell until CU reaches 50%; low AC devices are pushed to other cells at lower RSSI than higher AC devices, AC_BE devices are pushed to 2.4 GHz while AC_VO devices are not, etc.). A similar arbitration logic may be made for devices running business-critical applications vs devices running non-business-critical applications.

f.) Wi-Fi/LTE arbitration: Devices that are identified as supporting both LTE and Wi-Fi technologies can also be disconnected from Wi-Fi and pushed to LTE.

g.) "Critical" device management (e.g., those that are of particular importance, such as premium customers): Similar to the previous systems, load balancing arbitration can account for the device type (e.g., critical devices may be left in the target cell while other devices are pushed out, or critical devices may be pushed out at lower thresholds, etc.).

It is important to note that all these load balancing mechanisms are not always leveraged "after the fact" (i.e., after a given device has reached a flash crowded cell). On the contrary, the knowledge of the coming overcrowding issue, the device trajectory while approaching the overcrowding point and the threshold based adaptive system (start load balancing at X % capacity for devices/clients of category Y) make that load balancing can occur before devices reach the overcrowded zone (e.g., devices may be declined association to the cell of increasing load, or be pushed or maintained, e.g., with 802.11v, to neighboring cells before reaching the cells of increasing load).

Figure 9:
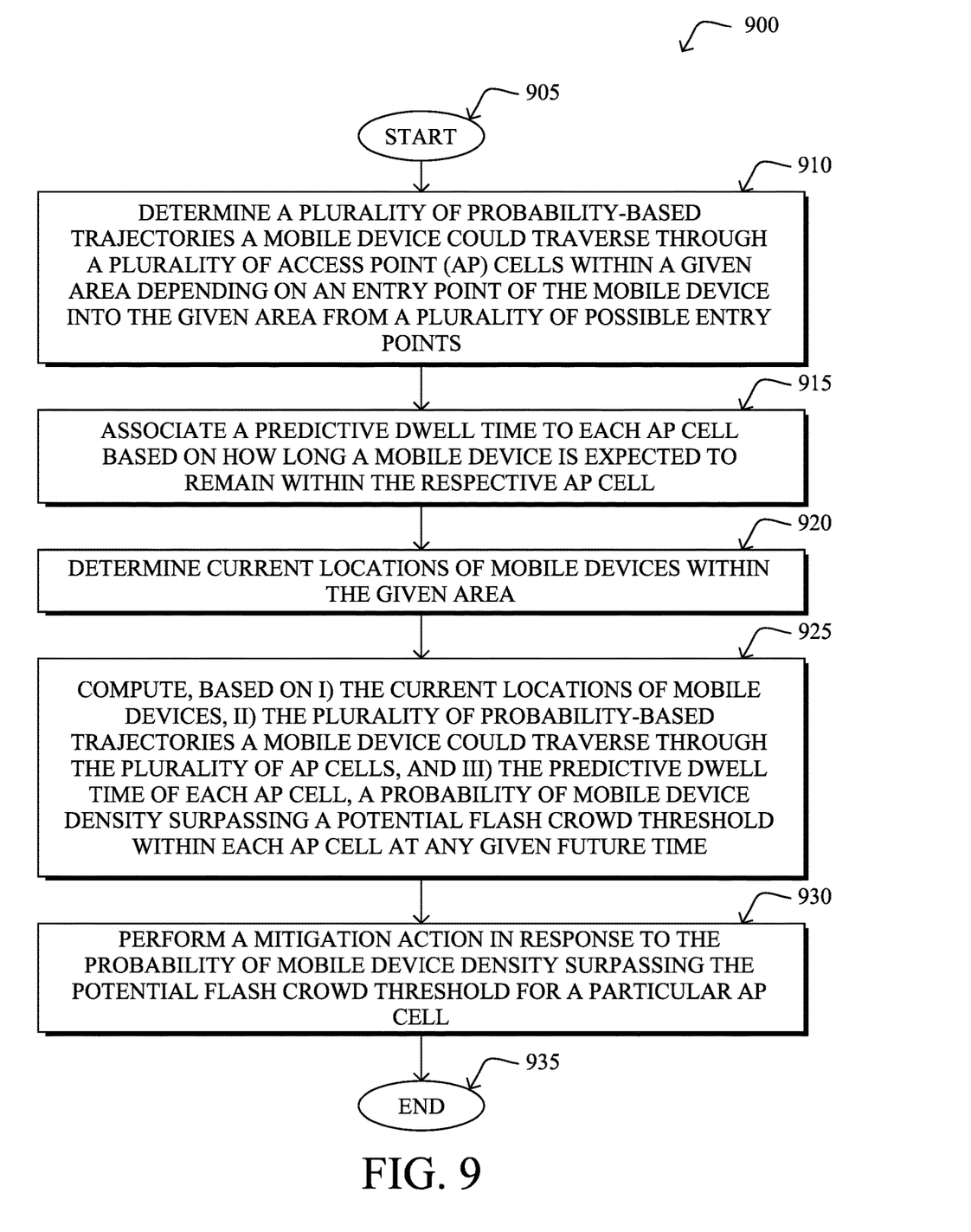
FIG. 9 illustrates an example simplified procedure for flash crowd detection and responsive network management.

FIG. 9 illustrates an example simplified procedure for flash crowd detection and responsive network management in accordance with one or more embodiments described herein. For example, a non-generic, specifically configured device (e.g., device 200, such as an AP, controller, server, or other device) may perform procedure 900 by executing stored instructions (e.g., process 248). The procedure 900 may start at step 905, and continues to step 910, where, as described in greater detail above, a plurality of probability-based trajectories a mobile device could traverse through a plurality of AP cells within a given area are determined depending on an entry point of the mobile device into the given area from a plurality of possible entry points. For instance, as mentioned above, the plurality of probability-based trajectories may be determined over time (e.g., where determining the plurality of probability-based trajectories uses historical data of mobile device movement and a regression technique such as linear regression). Alternatively, the plurality of probability-based trajectories may be determined temporally, such as based on, for each particular AP cell, a number of mobile devices within neighboring AP cells of the respective particular AP cell and a rate of increase of mobile devices into the respective particular AP cell. (Note also that the techniques herein can determine particular AP cells with potential flash crowding based on overlaps in the plurality of probability-based trajectories.)

In step 915, the techniques herein associate a predictive dwell time to each AP cell based on how long a mobile device is expected to remain within the respective AP cell. That is, as described above, the techniques may compute the predictive dwell time for each AP cell based on whether each respective AP cell is a transit location, a dwelling location, or a hybrid location where some mobile devices transit and other mobile devices dwell. The predictive dwell time for each AP cell may also be based on a time of day (e.g., longer dwelling in a food court around lunch or dinner times, etc.).

In addition, in step 920, the techniques herein determine current locations of mobile devices within the given area. Notably, though the term "mobile device" has been generally used throughout the description, the techniques herein may also track users (e.g., numbers and locations of people), and then an assumption could be made regarding the number of mobile devices. For instance, assume a large group of people headed toward a conference center. The tracking of people may assist in anticipating mobile device movement, especially where those mobile devices are only logged in once reaching their final destination.

In step 925, the techniques herein may correspondingly compute, based on i) the current locations of mobile devices, ii) the plurality of probability-based trajectories a mobile device could traverse through the plurality of AP cells, and iii) the predictive dwell time of each AP cell, a probability of mobile device density surpassing a potential flash crowd threshold within each AP cell at any given future time. Notably, the potential flash crowd threshold may be set to be surpassed prior to a congestion condition within an associated AP cell (i.e., triggering response before it's too late), and may also be set independently for each AP cell based on capabilities of the AP cell and/or typical usage of the AP cell. Furthermore, the potential flash crowd threshold could be based on a rate of change within a particular AP, such as where a given a number of mobile devices attached to an AP increases more rapidly than a rate of change threshold within a given time period.

It is important to note also that particular probability-based trajectories may be updated as particular mobile devices traverse through the plurality of AP cells (e.g., the closer the device gets to a particular destination, the more likely it is that the trajectory will have a higher probability of being correct). Also, the plurality of probability-based trajectories may be weighted based on one or more mobile device characteristics, such that computing the probability of mobile device density surpassing the potential flash crowd threshold in step 925 can be based on the one or more mobile device characteristics of the mobile devices currently within the given area (e.g., whether they are laptops or phones, whether they are from one manufacturer or another, and so on).

In response to the probability of mobile device density surpassing the potential flash crowd threshold for a particular AP cell, then in step 930 the techniques herein may perform one or more mitigation actions. For example, as mentioned above, the techniques herein may increase strength of one or more neighboring AP cells of the particular AP cell to attract mobile devices to join those neighboring AP cells (e.g., and may also decrease strength of the particular AP cell to further attract mobile devices to join those neighboring AP cells). Alternatively or in addition, the techniques herein may perform one or more wireless network option arbitrations (e.g., 2.4 GHz/5 GHz arbitration, Wi-Fi/LTE arbitration, etc.) to reduce congestion on one particular wireless network option. As still another example option, the techniques herein may perform directed roaming to force certain mobile devices to join one or more one or more neighboring AP cells of the particular AP cell.

The illustrative simplified procedure 900 may then end in step 935, notably with the option to continue monitoring for potential flash crowding, accordingly.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for flash crowd detection and responsive network management. In particular, the techniques increase awareness of potential flash crowding locations, based on recording device presence, roaming trajectories, and dwell times. With this knowledge, manual or automatic increases in AP density or strength can be performed in weaker locations (potential flash crowd points). The techniques herein are applicable for both stable networks (e.g., shopping malls) and also temporary setups (e.g., fairs, etc.) where there is little time to observe users' behaviors before user density increases.

Additionally, the techniques herein can determine the likelihood of a flash crowd event occurring in the close upcoming future, and can send alerts, accordingly. This knowledge can be used to adjust network parameters (e.g., load balancing devices across a larger set of cells and connections, to load balance users across multiple radios), or to attempt to orient part of the crowd along different paths and limit the crowd density as the quantity of users increases (and before reaching the flash crowding point).

While there have been shown and described illustrative embodiments that provide for flash crowd detection and responsive network management, it is to be understood that various other adaptations and modifications may be made within the spirit and scope of the embodiments herein. For example, while certain embodiments are described herein with respect to using certain algorithms for purposes of flash crowd prediction, the algorithms are not limited as such, and other algorithms may be used in other embodiments. In addition, while certain protocols are shown, such as Wi-Fi, other suitable protocols that may be subjected to flash crowding may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
 determining, by a computing device, a plurality of probability-based trajectories a mobile device could traverse through a plurality of access point (AP) cells within a given area depending on an entry point of the mobile device into the given area from a plurality of possible entry points;
 associating, by the computing device, a predictive dwell time to each AP cell based on how long a mobile device is expected to remain within the respective AP cell;
 determining, by the computing device, current locations of mobile devices within the given area;
 computing, by the computing device based on i) the current locations of mobile devices, ii) the plurality of probability-based trajectories a mobile device could traverse through the plurality of AP cells, and iii) the predictive dwell time of each AP cell, a probability of mobile device density surpassing a potential flash crowd threshold within each AP cell at any given future time; and
 performing, by the computing device, a mitigation action in response to the probability of mobile device density surpassing the potential flash crowd threshold for a particular AP cell among the plurality of AP cells, wherein performing the mitigation action comprises decreasing strength of the particular AP cell to attract mobile devices to join one or more neighboring AP cells of the particular AP cell, wherein the one or more neighboring AP cells are among the plurality of AP cells.

2. The method as in claim 1, wherein determining the plurality of probability-based trajectories uses historical data of mobile device movement and a regression technique.

3. The method as in claim 1, further comprising:
updating a particular probability-based trajectory as a particular mobile device traverses through the plurality of AP cells.

4. The method as in claim 1, further comprising:
weighting the plurality of probability-based trajectories based on one or more mobile device characteristics, wherein computing the probability of mobile device density surpassing the potential flash crowd threshold within each AP cell at any given future time is based on the one or more mobile device characteristics of the mobile devices currently within the given area.

5. The method as in claim 1, further comprising:
computing the predictive dwell time for each AP cell based on a time of day.

6. The method as in claim 1, further comprising:
computing the predictive dwell time for each AP cell based on whether each respective AP cell is a transit location, a dwelling location, or a hybrid location where some mobile devices transit and other mobile devices dwell.

7. The method as in claim 1, wherein the probability of mobile device density surpassing the potential flash crowd threshold within each AP cell at any given future time is based on a number of mobile devices attached to an AP increasing more rapidly than a rate of change threshold within a given time period.

8. The method as in claim 1, further comprising:
determining particular AP cells with potential flash crowding based on overlaps in the plurality of probability-based trajectories.

9. The method as in claim 1, wherein the potential flash crowd threshold is set to be surpassed prior to a congestion condition within an associated AP cell.

10. The method as in claim 1, wherein the potential flash crowd threshold is set independently for each AP cell based on one or both of capabilities of the AP cell and typical usage of the AP cell.

11. The method as in claim 1, wherein the plurality of probability-based trajectories are determined over time.

12. The method as in claim 1, wherein the plurality of probability-based trajectories are determined temporally based on, for each particular AP cell, a number of mobile devices within neighboring AP cells of the respective particular AP cell and a rate of increase of mobile devices into the respective particular AP cell.

13. The method as in claim 1, wherein the mitigation action comprises:
increasing strength of the one or more neighboring AP cells of the particular AP cell to further attract mobile devices to join those neighboring AP cells.

14. The method as in claim 1, wherein the mitigation action comprises:
performing one or more wireless network option arbitrations to reduce congestion on one particular wireless network option.

15. The method as in claim 1, wherein the mitigation action comprises:
performing directed roaming to force certain mobile devices to join one or more one or more neighboring AP cells of the particular AP cell.

16. A tangible, non-transitory, computer-readable medium storing program instructions that cause a computer to execute a process comprising:
determining a plurality of probability-based trajectories a mobile device could traverse through a plurality of access point (AP) cells within a given area depending on an entry point of the mobile device into the given area from a plurality of possible entry points;
associating a predictive dwell time to each AP cell based on how long a mobile device is expected to remain within the respective AP cell;
determining current locations of mobile devices within the given area;
computing, based on i) the current locations of mobile devices, ii) the plurality of probability-based trajectories a mobile device could traverse through the plurality of AP cells, and iii) the predictive dwell time of each AP cell, a probability of mobile device density surpassing a potential flash crowd threshold within each AP cell at any given future time; and
performing a mitigation action in response to the probability of mobile device density surpassing the potential flash crowd threshold for a particular AP cell among the plurality of AP cells, wherein performing the mitigation action comprises decreasing strength of the particular AP cell to attract mobile devices to join one or more neighboring AP cells of the particular AP cell, wherein the one or more neighboring AP cells are among the plurality of AP cells.

17. The computer-readable medium as in claim 16, wherein the plurality of probability-based trajectories are determined temporally based on, for each particular AP cell, a number of mobile devices within neighboring AP cells of the respective particular AP cell and a rate of increase of mobile devices into the respective particular AP cell.

18. The computer-readable medium as in claim 16, wherein the process, when performing the mitigation action, comprises:
increasing strength of the one or more neighboring AP cells of the particular AP cell to further attract mobile devices to join those neighboring AP cells.

19. An apparatus, comprising:
one or more network interfaces to communicate with a computer network;
a processor coupled to the network interfaces and configured to execute one or more process; and
a memory configured to store a process executable by the processor, the process when executed configured to:
determine a plurality of probability-based trajectories a mobile device could traverse through a plurality of access point (AP) cells within a given area depending on an entry point of the mobile device into the given area from a plurality of possible entry points;
associate a predictive dwell time to each AP cell based on how long a mobile device is expected to remain within the respective AP cell;
determine current locations of mobile devices within the given area;
compute, based on i) the current locations of mobile devices, ii) the plurality of probability-based trajectories a mobile device could traverse through the plurality of AP cells, and iii) the predictive dwell time of each AP cell, a probability of mobile device density surpassing a potential flash crowd threshold within each AP cell at any given future time; and
perform a mitigation action in response to the probability of mobile device density surpassing the potential flash crowd threshold for a particular AP cell among the plurality of AP cells, wherein to perform the mitigation action comprises decreasing strength of the particular AP cell to attract mobile devices to join one or more neighboring AP cells of the particular AP cell, wherein the one or more neighboring AP cells are among the plurality of AP cells.

* * * * *

UNITED STATES PATENT AND TRADEMARK OFFICE
CERTIFICATE OF CORRECTION

PATENT NO. : 10,623,994 B2
APPLICATION NO. : 15/902239
DATED : April 14, 2020
INVENTOR(S) : Jerome Henry et al.

Page 1 of 1

It is certified that error appears in the above-identified patent and that said Letters Patent is hereby corrected as shown below:

In the Specification

Column 6, Line 6, should read as follows:
AP cells (e.g., at a given time t in the future). For instance, Column 8, Line 24, should read as follows:
the AP signal falls below -75 dBm. Similarly, various classes Signed and Sealed this
Fourth Day of May, 2021

Drew Hirshfeld
*Performing the Functions and Duties of the
Under Secretary of Commerce for Intellectual Property and
Director of the United States Patent and Trademark Office*